US011258729B2

(12) United States Patent
Alapati et al.

(10) Patent No.: US 11,258,729 B2
(45) Date of Patent: Feb. 22, 2022

(54) DEPLOYING A SOFTWARE DEFINED NETWORKING (SDN) SOLUTION ON A HOST USING A SINGLE ACTIVE UPLINK

(71) Applicant: VMware, Inc., Palo Alto, CA (US)

(72) Inventors: Rishi Kanth Alapati, Palo Alto, CA (US); Subin Cyriac Mathew, San Jose, CA (US); Chidambareswaran Raman, Campbell, CA (US); Amit Aneja, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 14 days.

(21) Appl. No.: 16/299,697

(22) Filed: Mar. 12, 2019

(65) Prior Publication Data

US 2020/0274828 A1 Aug. 27, 2020

Related U.S. Application Data

(60) Provisional application No. 62/811,525, filed on Feb. 27, 2019.

(51) Int. Cl.
| | |
|---|---|
| *H04L 12/28* | (2006.01) |
| *H04L 49/00* | (2022.01) |
| *H04L 45/586* | (2022.01) |
| *H04L 49/356* | (2022.01) |
| *H04L 12/46* | (2006.01) |
| *H04L 45/64* | (2022.01) |

(52) U.S. Cl.
CPC .......... *H04L 49/70* (2013.01); *H04L 12/4641* (2013.01); *H04L 45/586* (2013.01); *H04L 45/64* (2013.01); *H04L 49/30* (2013.01); *H04L 49/356* (2013.01)

(58) Field of Classification Search
CPC .................................................. H04L 12/4641
See application file for complete search history.

(56) References Cited

U.S. PATENT DOCUMENTS 8,964,601 B2 * 2/2015 Kamath ................ H04L 45/586
370/254
9,154,327 B1 * 10/2015 Marino ............... H04L 41/0813
(Continued)

OTHER PUBLICATIONS

Aneja, Amit. "Flexible deployment options for NSX-T Data Center Edge VM". Oct. 30, 2018. pp. 1-12. https://blogs.vmware.com/networkvirtualization/2018/10/flexible-deployment-options-for-nsx-t-edge-vm.html/.

(Continued)

*Primary Examiner* — Guang W Li
(74) *Attorney, Agent, or Firm* — Patterson + Sheridan, LLP

(57) ABSTRACT

The disclosure provides an approach for deploying an software defined networking (SDN) solution on a host using a single virtual switch and a single active network interface card (NIC) to handle overlay traffic and also other types of network traffic, such as traffic between management components of the logical overlay networks, traffic of a virtual storage area network (VSAN), traffic used to move VMs between hosts, traffic associated with VMKernel services or network stacks provided by a VMKernel that is provided as part of the hypervisor on the host, a gateway device that may be implemented as a VCI on the host, and different SDN-related components, such as an SDN manager implementing the MP and an SDN controller implementing the CP, etc.

17 Claims, 3 Drawing Sheets

(56) References Cited

U.S. PATENT DOCUMENTS

| | | | | |
|---|---|---|---|---|
| 9,426,095 | B2* | 8/2016 | Pandey | H04L 49/00 |
| 9,641,435 | B1* | 5/2017 | Sivaramakrishnan | |
| | | | | H04L 69/166 |
| 9,853,898 | B1* | 12/2017 | Subramanian | H04L 45/745 |
| 10,127,067 | B2* | 11/2018 | Gu | H04L 49/70 |
| 2003/0130832 | A1* | 7/2003 | Schulter | H04L 12/28 |
| | | | | 703/23 |
| 2014/0280846 | A1* | 9/2014 | Gourlay | H04L 63/0876 |
| | | | | 709/223 |
| 2015/0188773 | A1* | 7/2015 | DeCusatis | G06F 9/45558 |
| | | | | 370/254 |
| 2015/0263970 | A1* | 9/2015 | Macchiano | H04L 45/22 |
| | | | | 709/223 |
| 2015/0281048 | A1* | 10/2015 | Agarwal | H04L 61/2007 |
| | | | | 370/236 |
| 2016/0094366 | A1* | 3/2016 | Wang | H04L 12/4625 |
| | | | | 370/401 |
| 2016/0173338 | A1* | 6/2016 | Wolting | H04L 67/1097 |
| | | | | 709/223 |
| 2016/0197824 | A1* | 7/2016 | Lin | H04L 45/38 |
| | | | | 370/389 |
| 2016/0226700 | A1* | 8/2016 | Zhang | H04L 69/329 |
| 2016/0232019 | A1* | 8/2016 | Shah | G06F 9/45558 |
| 2017/0019351 | A1* | 1/2017 | Sindhu | H04L 45/64 |
| 2017/0180273 | A1* | 6/2017 | Daly | H04L 69/324 |
| 2017/0310586 | A1* | 10/2017 | Lin | H04L 12/6418 |
| 2018/0019948 | A1* | 1/2018 | Patwardhan | H04L 47/2475 |
| 2018/0062920 | A1* | 3/2018 | Srinivasan | G06F 9/5027 |
| 2018/0139240 | A1* | 5/2018 | Voit | H04L 63/1433 |
| 2018/0159781 | A1* | 6/2018 | Mehta | H04L 41/0893 |
| 2018/0205619 | A1* | 7/2018 | Rios | G06F 9/45558 |
| 2018/0270084 | A1* | 9/2018 | Pzmny | H04L 12/4633 |
| 2018/0302243 | A1* | 10/2018 | Li | G06F 9/455 |
| 2018/0309718 | A1* | 10/2018 | Zuo | H04L 61/103 |
| 2018/0349163 | A1* | 12/2018 | Gao | H04L 12/4641 |
| 2018/0359145 | A1* | 12/2018 | Bansal | H04L 41/28 |
| 2019/0036868 | A1* | 1/2019 | Chandrashekhar | H04L 45/021 |
| 2019/0036894 | A1* | 1/2019 | Wang | H04L 63/166 |
| 2019/0058649 | A1* | 2/2019 | Qi | H04L 41/0893 |
| 2019/0068689 | A1* | 2/2019 | Ram | H04L 63/0272 |
| 2019/0123984 | A1* | 4/2019 | Nainar | H04L 43/12 |
| 2019/0196879 | A1* | 6/2019 | Dutta | G06F 9/5038 |
| 2019/0215200 | A1* | 7/2019 | Uberoy | H04L 12/4641 |
| 2019/0245949 | A1* | 8/2019 | Wang | H04L 69/22 |
| 2020/0007383 | A1* | 1/2020 | Efraim | H04L 41/0668 |

OTHER PUBLICATIONS

Lam, William. "ESXi host with network redundancy using NSX-T and only 2 pNICs?". virtuallyGhetto. Mar. 27, 2018. pp. 1-23. https://www.virtuallyghetto.com/2018/03/esxi-host-with-network-redundancy-using-nsx-t-and-only-2-pnics.html.

VMkernel Migration to an N-VDS Switch. VMware Docs. Sep. 17, 2018. https://docs.vmware.com/en/VMware-NSX-T/2.2/com.vmware.nsxt.install.doc/GUID-9E0AEE65-B24A-4288-B62E-4C71FB2B51BA.html.

* cited by examiner

DEPLOYING A SOFTWARE DEFINED NETWORKING (SDN) SOLUTION ON A HOST USING A SINGLE ACTIVE UPLINK

This application claims the benefit of U.S. application Ser. No. 62/811,525 entitled "DEPLOYING A SOFTWARE DEFINED NETWORKING (SDN) SOLUTION ON A HOST USING A SINGLE ACTIVE UPLINK," which was filed Feb. 27, 2019. The aforementioned application is herein incorporated by reference in its entirety.

BACKGROUND

Software defined networking (SDN) comprises a plurality of hosts in communication over a physical network infrastructure of a data center (e.g., on-premise data center or a cloud data center), each host having one or more virtualized endpoints such as virtual machines (VMs), containers, or other virtual computing instances (VCIs). These VCIs may be connected across the multiple hosts in a manner that is decoupled from the underlying physical network infrastructure. In one example, the VCIs may be connected to logical overlay networks that may span multiple hosts and are decoupled from the underlying physical network infrastructure.

SDN involves the use of a management plane (MP) and a control plane (CP). The management plane is responsible for receiving network configuration input from, for example, an administrator and generating desired state data that specifies how the logical network should be implemented in the physical infrastructure. The control plane is responsible for determining the logical overlay network topology and maintaining information about network entities such as logical switches, logical routers, endpoints, etc. The logical topology information specifying the desired state of the network is translated by the control plane into network configuration data that is then communicated to network elements of each host. The network configuration data, for example, includes forwarding table entries to populate forwarding tables at virtual switch(es) provided by the hypervisor (i.e., virtualization software) deployed on each host. An example control plane logical network controller is described in U.S. Pat. No. 9,525,647 entitled "Network Control Apparatus and Method for Creating and Modifying Logical Switching Elements," which is fully incorporated herein by reference.

For example, any arbitrary set of VMs in a datacenter may be placed in communication across a logical Layer 2 network by connecting them to a logical switch. Each logical switch corresponds to a virtual network identifier (VNI). The logical switch is collectively implemented by at least one virtual switch on each host that has a VM connected to the logical switch. The virtual switch on each host operates as a managed edge switch implemented in software by the hypervisor on each host. Forwarding tables at the virtual switches instruct the host to encapsulate packets, using a virtual tunnel endpoint (VTEP) for communication from a participating VM to another VM on the logical network but on a different (destination) host. The original packet from the VM is encapsulated at the VTEP with an outer IP header addressed to the destination host using a mapping of VM IP addresses to host IP addresses. At the destination host, a second VTEP decapsulates the packet and then directs the packet to the destination VM. Logical routers extend the logical network across subnets or other network boundaries using IP routing in the logical domain.

For example, the VTEP may be associated with software components, or it may itself, provide Layer 2 tunneling services for encapsulating egress packets from VMs and decapsulating ingress packets to implement a logical overlay network to interconnect VMs running on different hosts as part of the same layer 2 logical overlay network, meaning as part of the same logical layer-2 network/broadcast domain in the logical overlay network. Tunneling services may be implemented using tunneling protocols such as virtual extensible local area network (VXLAN), Stateless Transport Tunneling (STT), Generic Network Virtualization Encapsulation (GENEVE), or Generic Routing Encapsulation (GRE).

VTEP services may be implemented at each host or at a gateway. Edge VTEPs or hypervisor-based VTEPs are generally connected to virtual switches implemented by the hypervisor for virtual machines on the same physical host. Hardware VTEPs are often integrated into top-of-rack (TOR) switches, but could be provided as a stand-alone appliance for bridging logical overlay networks with physical networks.

It should be noted that the term VTEP originally referred to a "VXLAN tunneling endpoint" and VNI referred to a "VXLAN network identifier." However, while originally the terms "VTEP" and "VNI" referred to "VXLAN" tunneling protocol, they are now often used regardless of the tunneling protocol, and therefore referred to herein as a "virtual" instead. This "backronym" can be misleading as the tunnel is not itself virtual, but does carry logical overlay networking traffic, which is sometimes referred to as virtual network traffic.

Typically, configuring a host computer ("host") with an SDN software suite or solution in a data center, such as a public cloud data center, involves deploying a virtual switch on the host, where the virtual switch is configured to handle/forward logical overlay networking traffic ("overlay traffic") corresponding to data communicated on the logical overlay networks that one or more VMs executing on the host may be a part of. Such a virtual switch configured to handle overlay traffic may be referred to herein as a SDN switch. Typically, the host also includes another virtual switch configured to handle other types of traffic, such as traffic between management components (e.g., management plane, control plane, etc.) of the logical overlay networks, traffic of a virtual storage area network (VSAN), traffic used to move VMs between hosts, traffic associated with VMKernel services or network stacks provided by a VMKernel that is provided as part of the hypervisor (i.e., virtualization software) on the host, a gateway device that may be implemented as a VCI on the host (e.g., also referred to as an edge services gateway (ESG) VCI or edge VM), and different SDN-related components, such as an SDN manager implementing the MP and an SDN controller implementing the CP, etc. Accordingly, using existing solutions, deploying an SDN switch on the host results in the host having two virtual switches, namely the deployed SDN switch as well as the host's existing other virtual switch (e.g., a virtual standard switch (VSS) or a virtual distributed switch (VDS)). An SDN manager may be part of a cluster of SDN managers executing on various hosts in the data center and is configured to implement the functionality of MP in a distributed manner. Also, an SDN controller may be part of a cluster of SDN controller executing on various hosts in the data center and is configured to implement the functionality of CP in a distributed manner.

As each of the two virtual switches on the host is required to have its own dedicated physical network interface card (PNIC), meaning each virtual switch is coupled to a different PNIC on an uplink port of the virtual switch, at least two PNICs have to be present on the host to provide connectivity to the two virtual switches. Accordingly, the host is required to have two active uplinks (e.g., corresponding to two active PNICs) to one or more networks using the at least two PNICs to support both of the virtual switches. In certain cases, to provide fault tolerance, each virtual switch is assigned multiple (e.g., two) PNICs (e.g., coupled to different uplink ports of the virtual switch). In certain cases, only one of the PNICs assigned to a virtual switch is active at a time, meaning there is only one active uplink for that virtual switch. In certain cases, multiple PNICs assigned to the virtual switch are used at the same time. Meaning there are multiple active uplinks for that virtual switch. Assignment of multiple PNICs to a virtual switch ensures that that the network traffic associated with a virtual switch is not disrupted in the event that one of the PNICs fails. Accordingly, the deployment of an SDN switch on a host, using current solutions that separate different types of traffic as handled by different virtual switches, may require at least two or even more PNICs (to provide fault tolerance) to be present on the host to support two active uplinks. However, as costs associated with hardware components, such as PNICs, may be significant, configuring hosts with a larger number of PNICs is not cost effective and does not result in an efficient use of hardware resources. As such, in certain data centers, hosts may be configured to use only one active uplink at a time, meaning only a single active PNIC.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for deploying an SDN solution on a host using a single virtual switch and a single active PNIC or NIC to handle overlay traffic and also other types of network traffic (also referred to herein as "other network traffic"), such as traffic between management components (e.g., management plane, control plane, etc.) of the logical overlay networks, traffic of a virtual storage area network (VSAN), traffic used to move VMs between hosts, traffic associated with VMKernel services or network stacks provided by a VMKernel that is provided as part of the hypervisor (i.e., virtualization software) on the host, a gateway device that may be implemented as a VCI on the host (e.g., also referred to as an edge services gateway (ESG) VCI or edge VM), and different SDN-related components, such as an SDN manager implementing the MP and an SDN controller implementing the CP, etc.

Figure 1:
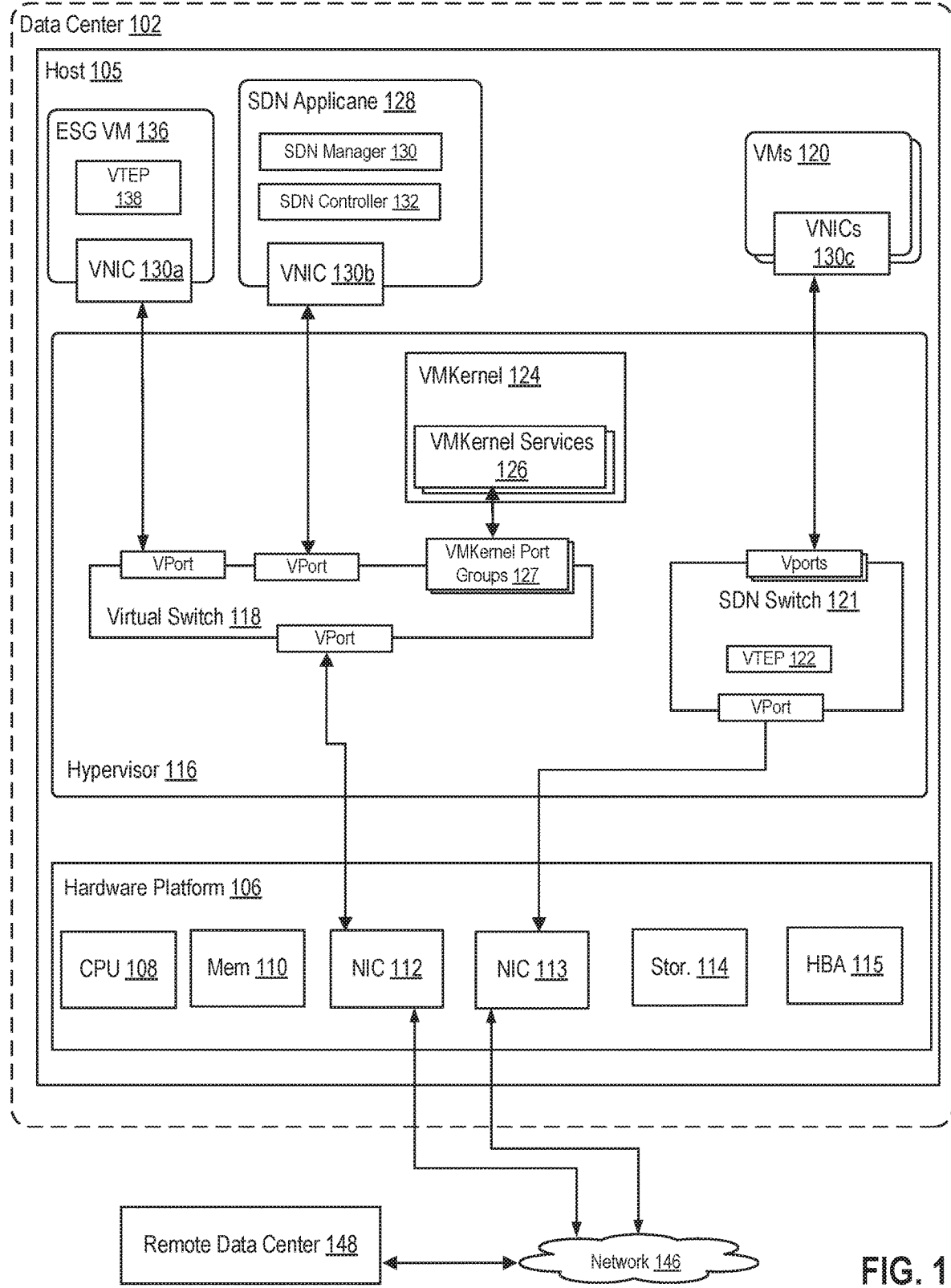
FIG. 1 depicts a block diagram of a host having two virtual switches each for different types of traffic and two separate PNICs, each assigned to one of the two virtual switches.

FIG. 1 depicts a block diagram of a host 105 that has been configured with an SDN solution, including an SDN switch 121 as well as an SDN appliance 128. Host 105 is part of a data center 102, which may be an on-premises data center or a cloud data center. Although not shown, data center 102 includes other hosts that, in some examples, are connected together using a network (not shown), such as a local area network (LAN). Hosts in data center 102 may be geographically co-located servers on the same rack or on different racks in any arbitrary location in data center 102.

In addition, data center 102 includes a management plane and a control plane. For example, as shown, host 105 includes SDN appliance 128, which includes SDN manager 130 that at least in part implements the management plane, and SDN controller 132 that at least in part implements the control plane. The management plane is concerned with receiving network configuration input from an administrator and generating desired state data that specifies how a logical network should be implemented in the physical infrastructure of data center 102. The control plane is concerned with determining the logical overlay network topology and maintaining information about network entities such as logical switches, logical routers, and endpoints, etc. The logical topology information is translated by the control plane into network configuration data that is then communicated to network elements of each host 105. The network configuration data, for example, includes forwarding table entries to populate forwarding tables at virtual switch(es) provided by the hypervisor deployed on each host 105, forwarding table entries to populate forwarding tables at host switches, configuration information such as MAC addresses for interfaces such as VNICs and virtual interfaces and host routers, etc. The management plane and control plane each may be implemented as single entities or may be implemented as distributed or clustered applications or components. For example, a management plane may include multiple computing devices or VCIs that implement management plane functions, and a control plane may include multiple central (or distributed) controller computers, VCIs, or processes that implement control plane functions.

Host 105 is configured to provide a virtualization layer, also referred to as a hypervisor 116, that abstracts processor, memory, storage, and networking resources of hardware platform 106 into multiple virtual machines, e.g., VM 120. VMs on the same host 105 may run concurrently. VMs 120, in one example, are referred to as compute resources that execute workload, such as web applications etc.

The hypervisor architecture may vary. In some embodiments, virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. Although parts of the disclosure is described with reference to VMs, the teachings herein also apply to other types of VCIs, such as containers, Docker containers, data compute nodes, isolated user space instances, namespace containers, and the like.

Host 105 may be constructed on a server grade hardware platform 106, such as an x86 architecture platform. Hardware platform 106 of host 105 may include components of a computing device such as one or more processors (CPUs) 108, system memory 110, network interfaces 112 and 113 (PNICs), storage system 114, a local host bus adapter (HBA) 115, and other I/O devices such as, for example, a mouse and keyboard (not shown). CPU 108 is configured to execute instructions, for example, executable instructions that perform one or more operations described herein and that may be stored in memory 110 and in storage 114. Network interfaces 112 and 113 enable host 105 to communicate with other devices via a communication medium, such a network that connects hosts in data center 102 and/or external network 146.

Storage system 114 represents local persistent storage devices (e.g., one or more hard disks, flash memory modules, solid state disks, and/or optical disks). Host bus adapter (HBA) 115 couples host 105 to one or more external storages (not shown), such as a storage area network (SAN) or distributed virtual SAN. Other external storages that may be used include network-attached storage (NAS) and other network data storage systems, which may be accessible via one or more of NICs 112 and 113. System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory.

As stated above, FIG. 1 shows host 105 in a state that is illustrative of host 105 being configured with an SDN solution. Configuring host 105 with an SDN solution allows VMs 120 to communicate as part of logical overlay networks that are decoupled from the underlying physical network infrastructure and may span multiple hosts located within data center 102 or outside of data center 102, such as at remote data center 148. Configuring host 105 with the SDN solution involves the deployment of a number of components, such as SDN manager 130, SDN controller 132, and SDN switch 121, among other components that are not shown.

SDN manager 130 implements management plane functions and may be one of multiple SDN managers executing on various hosts in data center 102 that together implement the functions of the management plane in a distributed manner. SDN controller 132 implements control plane functions and may be one of multiple SDN controllers executing on various hosts in data center 102 that together implement the functions of the control plane in a distributed manner. In certain aspects, an SDN manager and an SDN controller may execute as processes on different VMs. However, in the example of FIG. 1, both SDN manager 130 and SDN controller 132 execute as processes in a single SDN appliance 128, which may be a VM that is configured to run such components.

SDN switch 121 is a software abstraction that is able to forward the overlay traffic associated with logical overlay networks to which VMs 120 may connect. To support the SDN solution, hypervisor 116 is configured with two virtual switches, including SDN switch 121 as well as virtual switch 118.

Virtual switch 118 serves as a software-based interface between NIC 112 and other physical resources available on host 105 and a number of components including SDN appliance 128, VMKernel network stacks 126 of VMKernel 124, and ESG VM 136. VMKernel 124 refers to a high performance operating system that runs directly on hypervisor 116. For example, virtual switch 118 handles other network traffic as discussed. VMkernel 124 manages most of the physical resources on hardware platform 106, including memory 110, processors, storage 108, and NICs 112. VMKernel 124 also provides a certain set of network stacks 126 that are configured with the logic and protocols to manage network traffic associated with different VMKernel services, such as a management service, a storage service, a VM mobility service, etc. Generally, each network stack 126 can be accessed through virtual switch 118 via different sets of interfaces or port groups, such as VMKernel port groups 127. More specifically, traffic destined for each network stack 126 is forwarded to the network stack 126 through a certain VMKernel port group 127, with certain IP and MAC addresses. A VMKernel port group 127 refers to a group of ports on virtual switch 118 that correspond to a logical segmentation of virtual switch 118. To isolate the traffic associated with different VMKernel port groups 127, each port group 127 may be configured with a different virtual local area network (VLAN) ID on virtual switch 118. In other words, each port group may be operated as part of a separate VLAN. In certain aspects, an administrator may prefer not to isolate the traffic associated with different VMKernel port groups 127, in which case VLANs are not configured or a single VLAN is used.

ESG VM 136 is a VM that is configured to operate as a gateway device. A gateway device provides VMs 120 on host 105 and other components in data center 102 with connectivity to a network, such as network 146, that is external to data center 102 (e.g., a direct link, a local area network (LAN), a wide area network (WAN) such as the Internet, another type of network, or a combination of these). For example, the gateway device may manage external public IP addresses for VMs 120 and route traffic incoming to and outgoing from data center 102. The gateway device also provides other networking services, such as firewalls, network address translation (NAT), dynamic host configuration protocol (DHCP), and load balancing. In the example of FIG. 1, the gateway device is implemented as a VCI (e.g., VM), that is configured to execute on host 105, which is shown as ESG VM 136.

As shown, ESG VM 136 comprises a VTEP 138 used by ESG VM 136 for its communication with VMs in the logical overlay network. For example, VTEP 138 may be associated with software components, or it may itself, provide Layer 2 tunneling services for encapsulating egress packets from ESG VM 136 directed to other VMs and decapsulating ingress packets from other VMs to ESG VM 136. Other traffic communicated by ESG VM 136, such as with destinations on network 146, may not be encapsulated/decapsulated using VTEP 138.

As discussed, SDN switch 121 handles overlay traffic that is to be encapsulated/decapsulated as part of communication over a logical overlay network that VMs 120 participate in. As shown, SDN switch 121 comprises VTEP 122. SDN switch 121 is configured with forwarding tables that instruct host 105 to use VTEP 122 to encapsulate packets received from a participating VM 120 and destined for another VM that is on a different (destination) host and connected to the participating VM 120 through a logical network. VTEP 122 also decapsulates packets originated from the other VM and destined for the participating VM 120.

Each of the VMs, such as VMs 120, ESG VM 136, and SDN appliance 128, running on host 105 may include a virtual network interface card (VNIC), such as VNIC 130a-130c, which is responsible for exchanging packets between the VM and hypervisor 116. VNICs may be, in some cases, a software abstraction of a NIC (i.e., physical NIC). Further, each of the VMs is connected to a virtual port (vport)

provided by a virtual switch, such as virtual switch 118 and SDN switch 121. For example, ESG VM 136 and SDN appliance 128 connect to vports provided by virtual switch 118 while VMs 120 connect to vports provided by SDN switch 121.

As discussed, to support the SDN solution, host 105 is configured such that the network traffic handled by virtual switch 118 (traffic associated with VMKernel port groups 127, ESG VM 136, and SDN appliance 128) is isolated from the overlay traffic handled by SDN switch 121 on separate uplinks. In other words, SDN switch 121 is configured such that it cannot share a NIC with virtual switch 118. Accordingly, host 105 is required to support two active uplinks, one for each virtual switch, and accordingly needs at least two active NICs at a time. As such, in the example of FIG. 1, separate NICs are used to allow each of virtual switch 118 and SDN switch 121 to communicate with network destinations outside of host 105. More specifically, as shown in FIG. 1, NIC 112 is assigned to virtual switch 118 and NIC 113 is assigned to SDN switch 121. As discussed, to provide fault tolerance, an additional NIC may be assigned to each of virtual switch 118 and SDN switch 121. Accordingly, in the example of FIG. 1, a total of four NICs may be assigned to virtual switch 118 and SDN switch 121 in order to help prevent network disruption.

However, although host 105 of FIG. 1 is configured to use at least two active NICs, in certain data centers, hosts may be configured to use only a single active NIC at a time for cost saving measures. Accordingly, certain aspects described herein are directed to configuring a host to be able to use a single virtual switch and a single active NIC to support different types of traffic, including overlay traffic and other network traffic, as discussed, of an SDN solution. In the event that the host is configured with a second active NIC, to provide fault tolerance in such aspects, the second NIC may be additionally made available. As such, implementing the aspects described herein allows for fewer NICs to be used to support an SDN solution on a host.

Figure 2:
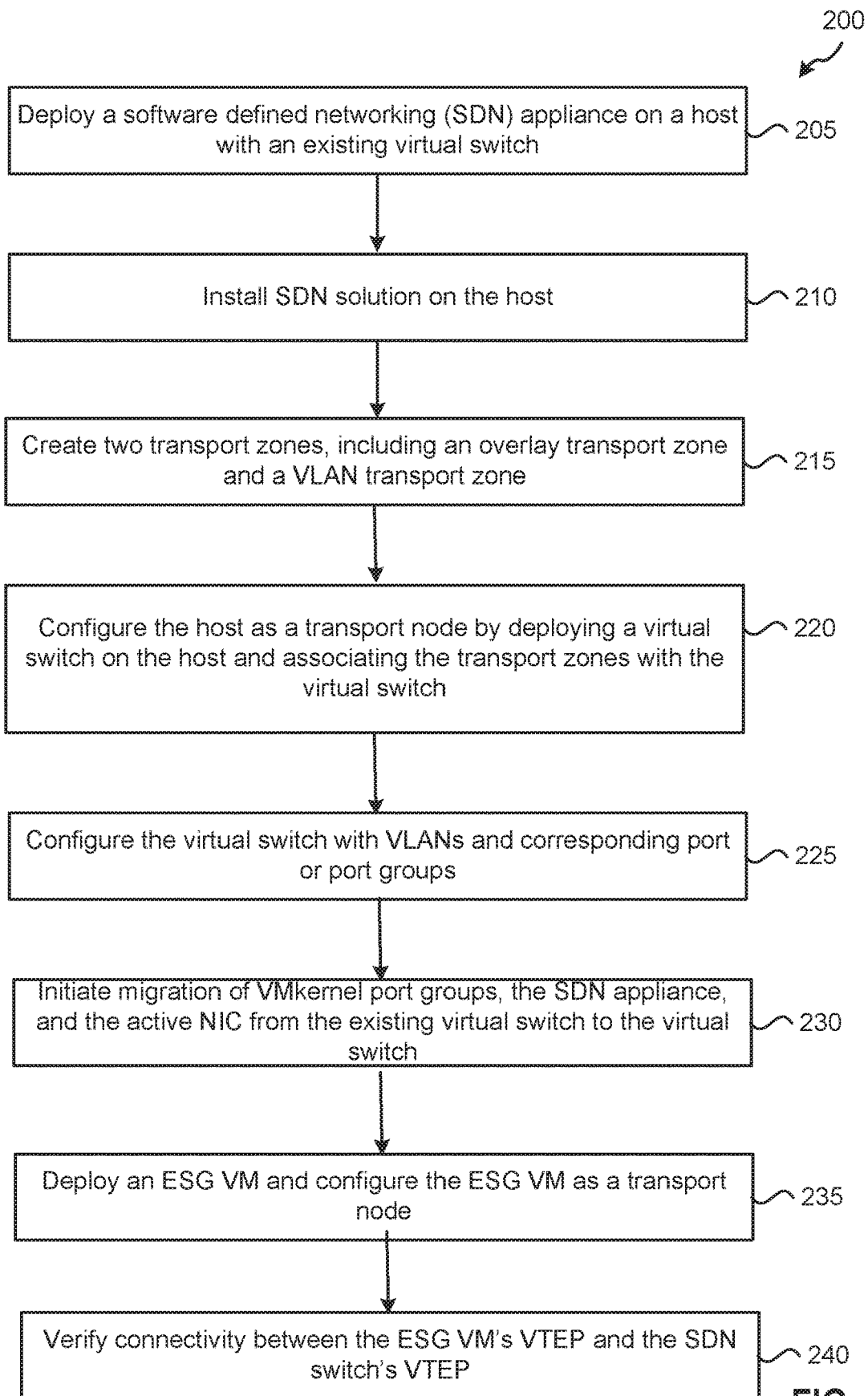
FIG. 2 depicts a flowchart of example operations for deploying an SDN solution on a host using a single virtual switch and a single active PNIC, according to one or more embodiments of the present invention.
Figure 3:
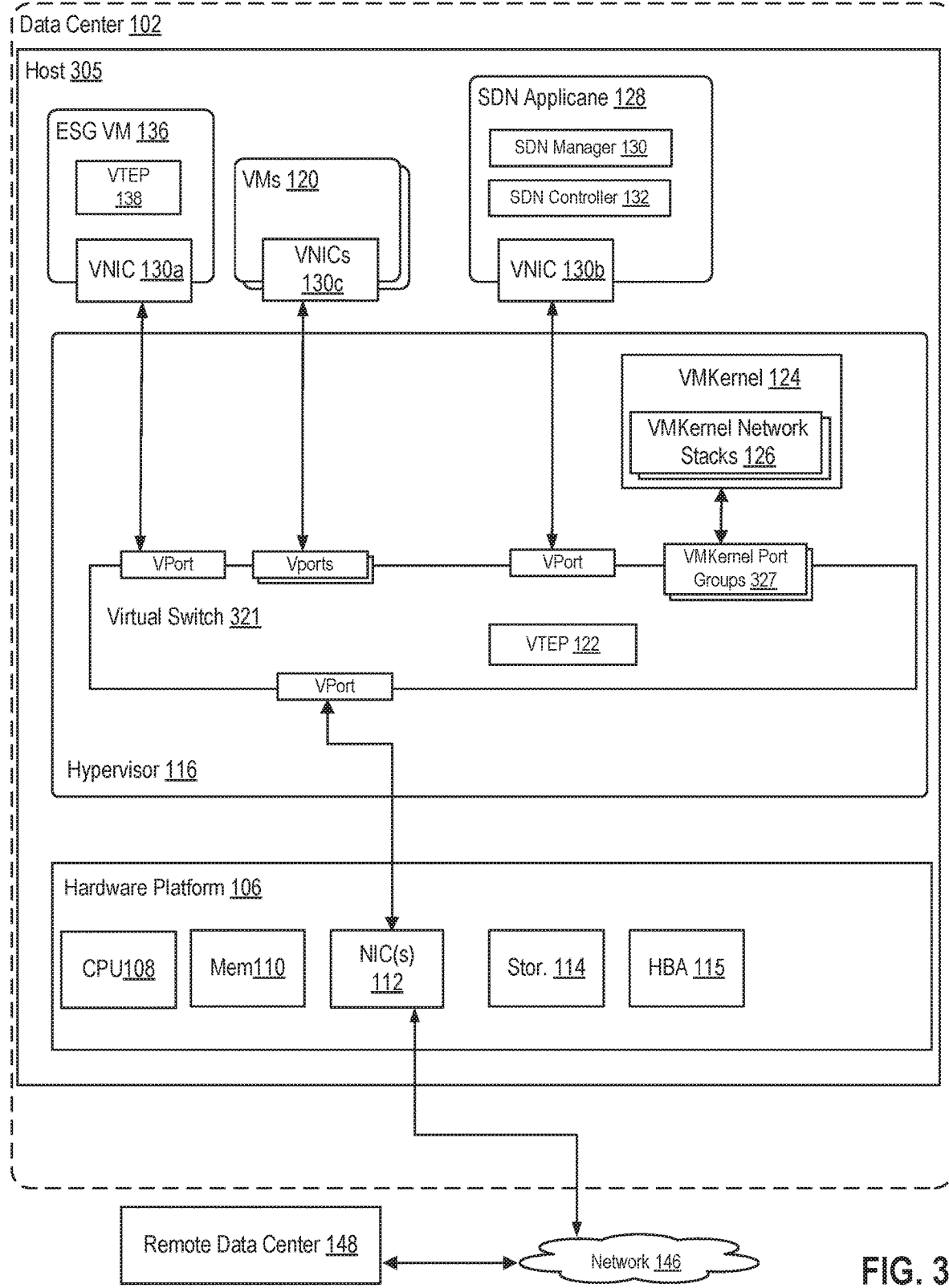
FIG. 3 depicts a block diagram of a host using a single virtual switch and a single active PNIC for supporting a SDN solution, according to one or more embodiments of the present invention.

FIG. 2 depicts a flowchart of example operations 200 for configuring a host having an already existing virtual switch with a SDN solution such that the host is able to use a single active PNIC/uplink (e.g., that was previously connected to the existing virtual switch) to support the SDN solution, according to one or more embodiments of the present invention. The virtual switch is referred to as having previously existed because a hypervisor of the host was already configured with virtual switch prior to deployment of the SDN solution. Operations 200 are described with reference to FIG. 1 as well as FIG. 3, which is illustrative of an example state of a host, shown as host 305, after the deployment of an SDN solution using the aspects described herein. Host 305 of FIG. 3 is identical or substantially similar to host 105, except that host 305 is only configured with a single active NIC 112. Note that host 305 may comprise additional NICs but only one NIC 112 is shown here to illustrate and emphasize that the aspects herein allows for deploying an SDN solution even on a host with a single NIC.

Further, although not shown, host 305 is previously configured with an existing virtual switch, such as virtual switch 118 that is configured to use NIC 112. However, upon the completion of operations 200, host 305 is configured to discontinue its use of the existing virtual switch and instead use virtual switch 321 (may also be referred to as an SDN switch or an SDN virtual switch) for all types of network traffic. As shown, in FIG. 3, virtual switch 321 is configured to handle other network traffic, such as the network traffic associated with ESG VM 136, SDN appliance 128, and VMKernel network stacks 126 as well as the overlay traffic associated with VMs 120.

At block 205, an administrator deploys an SDN appliance on a host with an existing virtual switch. For example, an administrator deploys SDN appliance 128 on host 305 with an existing switch (not shown), such as virtual switch 118 of FIG. 1, and a single active NIC 112. In certain other aspects, instead of deploying an SDN appliance, an administrator may instead deploy the different components of the SDN appliance separately, such as on separate VMs. For example, an administrator may deploy SDN manager 130 on one VM, and SDN controller 132 on another.

At block 210, the SDN manager, such as at the direction of an administrator, installs an SDN solution on the host. For example, SDN manager 130 installs an SDN solution on host 305. In one example, SDN manager 130 may provide a user interface through which the administrator is able to install the SDN solution. In another example, the administrator may install the SDN solution through an application programming interface (API) call to an API provided by SDN manager 130. Installing an SDN solution on host 305, in one example, may refer to the process of making the SDN solution ready for execution on host 305. In another example, installing an SDN solution on host 305 may refer to copying or storing code or instructions from installation files associated with the SDN solution to host 305. The SDN solution, among other things, comprises the necessary instructions for configuring and deploying a virtual switch, such as virtual switch 321, when executed. Note that at this point in operations 200, virtual switch 321 has not yet been deployed.

At block 215, the SDN manager, such as at the direction of an administrator, creates two transport zones, including an overlay transport zone and a VLAN transport zone. A transport zone defines the reach of host 305 in a logical overlay network, meaning that VMs on host 305 that are within a certain transport zone can communicate with one another but not with VMs that are not in that transport zone. For example, an overlay transport zone is created to define the reach of VMs 120 in their communications with other VMs on other hosts in data center 102 or other destinations, such as remote data center 148, over an overlay network. A VLAN transport zone is created as preparation for migrating, for example, the VMKernel port groups on host 305's existing switch (e.g., VMKernel port groups 127 on virtual switch 118 of FIG. 1) to virtual switch 321, which is yet to be deployed. A VLAN transport zone allows for allocating port groups on virtual switch 321 to various VMKernel network stacks 126 and configuring each port group with a different VLAN ID. This allows each VMKernel port group to operate as part of a different VLAN.

At block 220, the SDN manager configures the host as a transport node by deploying a virtual switch on the host and associating the transport zones with the virtual switch. A transport node refers to a host that acts as a tunnel endpoint by using a virtual switch that provided tunneling services. In the example of FIG. 3, the administrator uses SDN manager 130 to configure host 305 as a transport node by deploying virtual switch 321 on host 305 and associating the overlay and VLAN transport zones, created at block 210, with virtual switch 321.

At block 225, the SDN manager configures the virtual switch with different VLANs and corresponding ports or port groups. For example, SDN manager 130 configures virtual switch 321 with the same exact VLAN settings and configurations that the existing switch is configured with.

One example includes configuring virtual switch 321 with port groups similar to the VMKernel port groups on the existing switch (e.g., VMKernel port groups 127 on virtual switch 118 of FIG. 1). The VMKernel port groups configured on virtual switch 321 are shown as VMKernel port groups 327. VMKernel port groups 327 are configured in preparation for associating or connecting virtual switch 321 to VMKernel network stacks 126 at block 230.

SDN manager 130 also designates a certain vport on virtual switch 321 to be later connected to ESG VM 136 as well as a vport to be later connected to SDN appliance 128, at step 230. In addition, SDN manager 130 may assign a VLAN ID to the vport that is going to be connected to ESG VM 136 and a different VLAN ID to the vport that is going to be connected to SDN appliance 128. ESG VM 136's VLAN ID (also referred to as transport VLAN ID) may be different from VLAN IDs assigned to VMs 120 to ensure that the VMs 120 are able to communicate (through VTEP 122) with the ESG VM 136 (through VTEP 138) for overlay traffic via the underlay network.

At block 230, the SDN manager initiates the migration of the VMKernel port groups, the SDN appliance, and the active NIC from the existing virtual switch to the new virtual switch. Migrating these components to virtual switch 321 refers to associating VMKernel port groups 327 with VMKernel network stacks 126, associating a corresponding vport (prepared for SDN appliance 128 at step 225) to SDN appliance 128, and connecting a vport on virtual switch 321 to NIC 112. In certain aspects, the migration of these components are performed through one API call to SDN manager 128. The migration of these components are possible through a single API call because of how virtual switch 321 is already configured and prepared as a result of performing blocks 205-225. Migrating SDN appliance 128 with the VMKernel port groups and the active NIC is advantageous because it allows SDN appliance 128 to maintain its network connectivity to components that it communicates with, including VMKernel port groups 327, and so on.

At block 235, the SDN manager deploys an ESG VM and configures it as a transport node. For example, SDN manager 130 deploys ESG VM 136 and connects ESG VM 136 to the vport prepared for it at step 225. In addition, SDN manager 130 configures ESG VM 136 as a transport node by configuring ESG VM 136 with VTEP 138, as discussed.

At block 240, the SDN manager verifies network connectivity between the ESG VM's VTEP and the virtual switch's VTEP. For example, SDN manager 130 verifies network connectivity between VTEP 138 and VTEP 122. In one example, network connectivity is verified by one of VTEP 138 or VTEP 122 being triggered to send a message to the other to determine whether the other responds in return. If there is a response, network connectivity is verified, if not there is not network connectivity. In another example, a tunnel health protocol such as Bidirectional Forwarding Detection is implemented between VTEP 138 and VTEP 122 in order to verify the connectivity between the two VTEPs.

As described above, FIG. 3 illustrates a state of a host 305 configured to support a SDN solution using a single virtual switch 321, and a single active NIC 112, such as upon the completion of operations 200. As discussed, if host 305 is configured with a second active NIC, host 105 may be made fault tolerant by connecting the second NIC to virtual switch 321. In certain aspects, the administrator is provided with an easy button or a one-click button on the user interface associated with SDN manager 130. By clicking on the button, SDN manager 130 is configured to automatically perform steps 210-240 without the administrator having to intervene.

Accordingly, the aspects described herein provide a technical solution to a technical problem associated with deploying a SDN solution on a host with a limited number of NICs. More specifically, implementing the aspects herein allow for deploying a SDN solution on a host while using only a single virtual switch for different types of traffic, thereby allowing the host to handle such traffic using a single active uplink, and accordingly a single active NIC.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A host machine comprising:
   a physical network interface card (PNIC);
   a memory; and
   at least one processor configured to implement a virtual switch in a hypervisor, wherein:
   the virtual switch includes an uplink port coupled to the PNIC;
   the virtual switch includes a first port coupled to a network manager, separate from the hypervisor, configured to manage a logical overlay network;
   the virtual switch includes a second port coupled to a virtual computing instance (VCI), separate from the hypervisor, configured as coupled to the logical overlay network;
   the virtual switch is configured to forward a first plurality of packets to a first tunneling endpoint configured to encapsulate and decapsulate the first plurality of packets for the VCI as part of communication over the logical overlay network;
   the virtual switch is configured to communicate one or more packets from the network manager and the VCI over the uplink port to a physical network.

2. The host machine of claim 1, wherein the network manager is configured to use a first addressing corresponding to the physical network to which the PNIC is coupled, and wherein the VCI is configured to use a second addressing corresponding to the logical overlay network.

3. The host machine of claim 1, wherein the virtual switch is configured to forward a second plurality of packets received from a gateway device, and wherein the gateway device comprises a second tunneling endpoint.

4. The host machine of claim 3, wherein the second tunneling endpoint and the first tunneling endpoint are configured to verify network connectivity among the first tunneling endpoint and the second tunneling endpoint.

5. The host machine of claim 1, wherein the processor is configured to:
   deploy the network manager and a network controller on the host machine;
   install a software defined networking (SDN) solution on the host machine;
   create, at the network manager, two transport zones, including an overlay transport zone and a virtual local area network (VLAN) transport zone;
   configure the host machine as a transport node, wherein configuring the host machine as the transport node comprises deploying the virtual switch on the host machine and associating the overlay transport zone and the VLAN transport zone with the virtual switch;
   configure the virtual switch with a number of VLANs and corresponding port or port groups;
   initiate migration of one or more port groups, the network manager, the network controller, and the PNIC from an existing second switch to the virtual switch;
   deploy a gateway device on the virtual switch;
   configure the gateway device as a second transport node, wherein configuring the gateway device as the second transport node comprises configuring the gateway device with a second tunneling endpoint; and
   verify connectivity between the second tunneling endpoint and the first tunneling endpoint.

6. The host machine of claim 1, wherein the virtual switch is associated with two transport zones, including an overlay transport zone configured for overlay traffic associated with the logical overlay network as well as a virtual local area network (VLAN) transport zone configured for traffic associated with the network manager.

7. The host machine of claim 1, wherein the uplink port of the virtual switch is connected to a second PNIC for redundancy.

8. A method of implementing a virtual switch on a host machine, the method comprising:
   deploying a network manager and a network controller on the host machine, wherein the host machine comprises a physical network interface card (PNIC);
   installing a software defined networking (SDN) solution on the host machine;
   creating, at the network manager, two transport zones, including an overlay transport zone and a virtual local area network (VLAN) transport zone;
   configuring the host machine as a transport node, wherein configuring the host machine as the transport node comprises deploying the virtual switch on the host machine and associating the overlay transport zone and the VLAN transport zone with the virtual switch;
   configuring the virtual switch with a number of VLANs and corresponding port or port groups;
   initiating migration of one or more port groups, the network manager, the network controller, and the PNIC from an existing second switch to the virtual switch;
   deploying a gateway device on the virtual switch;
   configuring the gateway device as a second transport node, wherein configuring the gateway device as the second transport node comprises configuring the gateway device with a second tunneling endpoint; and
   verifying connectivity between the second tunneling endpoint and the first tunneling endpoint, wherein:
      the virtual switch includes an uplink port coupled to the PNIC;
      the virtual switch includes a first port coupled to the network manager configured to manage a logical overlay network;
      the virtual switch includes a second port coupled to a virtual computing instance (VCI) configured as coupled to the logical overlay network;
      the virtual switch is configured to forward a first plurality of packets to a first tunneling endpoint configured to encapsulate and decapsulate the first plurality of packets for the VCI as part of communication over the logical overlay network;
      the virtual switch is configured to communicate traffic of the network manager and the VCI over the uplink port.

9. The method of claim 8, wherein the network manager is configured to use a first addressing corresponding to a physical network to which the PNIC is coupled, and wherein the VCI is configured to use a second addressing corresponding to the logical overlay network.

10. The method of claim 8, wherein the virtual switch is configured to forward a second plurality of packets received from the gateway device, and wherein the gateway device comprises a second tunneling endpoint.

11. The method of claim 8, wherein the virtual switch is associated with the two transport zones, including the overlay transport zone configured for overlay traffic associated with the logical overlay network as well as the VLAN transport zone configured for traffic associated with the network manager.

12. The method of claim 8, wherein the uplink port of the virtual switch is connected to a second PNIC for redundancy.

13. A non-transitory computer readable medium having instructions stored thereon that, when executed by a computing system, cause the computing system to perform a method comprising:
   deploying a network manager and a network controller on the computing system, wherein the computing system comprises a physical network interface card (PNIC);
   installing a software defined networking (SDN) solution on the computing system;
   creating, at the network manager, two transport zones, including an overlay transport zone and a virtual local area network (VLAN) transport zone;
   configuring the computing system as a transport node, wherein configuring the computing system as the transport node comprises deploying the virtual switch on the computing system and associating the overlay transport zone and the VLAN transport zone with the virtual switch;
   configuring the virtual switch with a number of VLANs and corresponding port or port groups;
   initiating migration of one or more port groups, the network manager, the network controller, and the PNIC from an existing second switch to the virtual switch;
   deploying a gateway device on the virtual switch;
   configuring the gateway device as a second transport node, wherein configuring the gateway device as the second transport node comprises configuring the gateway device with a second tunneling endpoint; and
   verifying connectivity between the second tunneling endpoint and the first tunneling endpoint, wherein:
      the virtual switch includes an uplink port coupled to the PNIC;
      the virtual switch includes a first port coupled to the network manager configured to manage a logical overlay network;
      the virtual switch includes a second port coupled to a virtual computing instance (VCI) configured as coupled to the logical overlay network;
      the virtual switch is configured to forward a first plurality of packets to a first tunneling endpoint configured to encapsulate and decapsulate the first plurality of packets for the VCI as part of communication over the logical overlay network;
      the virtual switch is configured to communicate traffic of the network manager and the VCI over the uplink port.

14. The non-transitory computer readable medium of claim 13, wherein the network manager is configured to use a first addressing corresponding to a physical network to which the PNIC is coupled, and wherein the VCI is configured to use a second addressing corresponding to the logical overlay network.

15. The non-transitory computer readable medium of claim 13, wherein the virtual switch is configured to forward a second plurality of packets received from the gateway device, and wherein the gateway device comprises a second tunneling endpoint.

16. The non-transitory computer readable medium of claim 13, wherein the virtual switch is associated with the two transport zones, including the overlay transport zone configured for overlay traffic associated with the logical overlay network as well as the VLAN transport zone configured for traffic associated with the network manager.

17. The non-transitory computer readable medium of claim 13, wherein the uplink port of the virtual switch is connected to a second PNIC for redundancy.

\* \* \* \* \*